G. B. SMITH.
WATERPROOF FABRIC.
APPLICATION FILED DEC. 11, 1919.
1,364,818.
Patented Jan. 4, 1921.
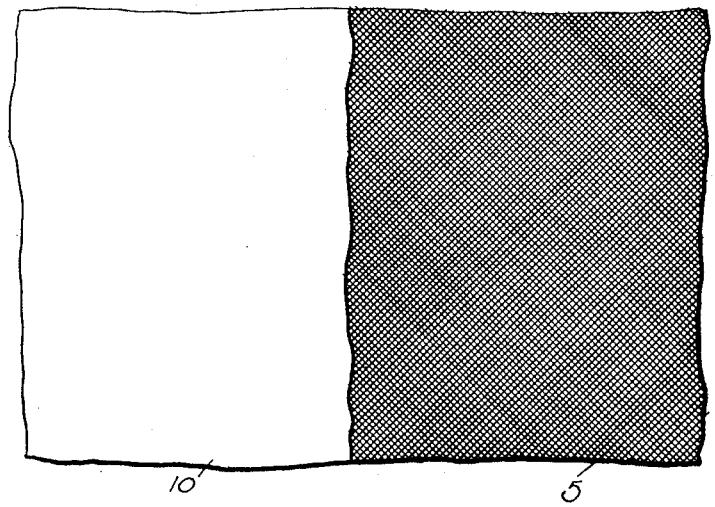
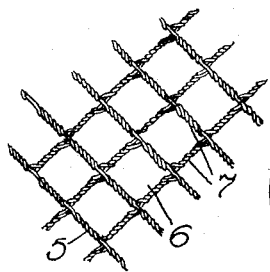
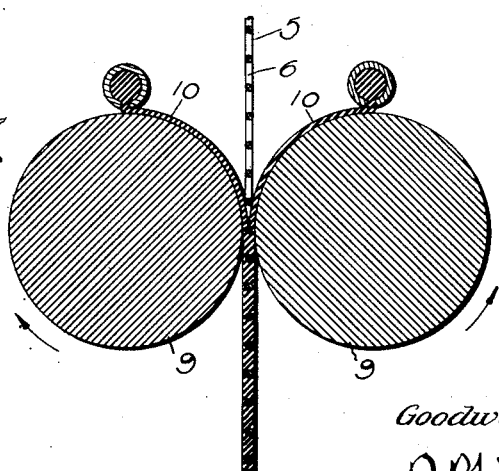
Inventor
Goodwin B. Smith
By B. P. Fishburne
Attorney

UNITED STATES PATENT OFFICE.

GOODWIN B. SMITH, OF PHILADELPHIA, PENNSYLVANIA.

WATERPROOF FABRIC.

1,364,818.   Specification of Letters Patent.   Patented Jan. 4, 1921.

Application filed December 11, 1919. Serial No. 343,994.

*To all whom it may concern:*

Be it known that I, GOODWIN B. SMITH, a citizen of the United States, residing at Philadelphia, in the county of Philadelphia and State of Pennsylvania, have invented certain new and useful Improvements in Waterproof Fabrics, of which the following is a specification.

My invention relates to a water-proof fabric.

As is well known, certain articles of apparel, such as baby pants or diapers, and sanitary aprons and knickers for women, are made free from rubber dam. This dam embodies closely woven fabric, having one side thereof coated with rubber.

The disadvantage of using ordinary rubber dam, for these purposes, is that, by the same becoming wet, the rubber coating is injured, and frequently peels or drops off. Further, the rubber dam does not ordinarily possess a desired degree of softness and flexibility, whereby it rubs or chafes soft skin, such as a baby's skin.

It has been proposed to use a sheet of rubber without the fabric backing, but this is disadvantageous, inasmuch as the rubber sheet readily tears and will not give the desired wear, when made suitably thin, to impart to it the desired flexibility and softness.

In accordance with my invention, I produce a thin and highly flexible fabric, which is smooth, upon both sides, and is sufficiently tough or strong to withstand the wear to which it is ordinarily subjected.

My improved fabric embodies a body or sheet of rubber, having the thickness of the combined thicknesses of the fabric backing and rubber coating of ordinary rubber dam, in which sheet is completely embedded an open fabric, serving to reinforce and strengthen the same.

In the accompanying drawings, forming a part of this specification, and in which like numerals are employed to designate like parts throughout the same.

Figure 1 is a fragmentary plan view of a fabric embodying my invention,

Fig. 2 is a very much enlarged section through the fabric,

Fig. 3 is a transverse section through the fabric and apparatus for producing the same, and, Fig. 4 is an enlarged elevation of the reinforcing fabric.

In the drawings, the numeral 5 designates an open woven reinforcing fabric, such as a net, having relatively large openings or voids 6, between the transverse portions 7. While I prefer to employ a reinforcing fabric of this type, yet the invention is not necessarily restricted to the same, as I may employ any suitable open fabric having openings or voids of suitable size to permit of the passage of the rubber liquid or rubber compound therein.

In the preferred method of producing the fabric, I pass the open reinforcing fabric 5 between revolving rolls 9. A rubber solution or compound is applied to the upper surfaces of the rolls 9, forming sheets or films 10 thereon. These sheets or films are applied by the rolls to the opposite sides of the open fabric 5, and these sheets are pressed inwardly by the rolls so that the material of the sheets passes through the voids 6, and the two sheets become bonded into an integral sheet. The open reinforcing fabric 5 is wholly embedded within the rubber sheet, whereby both sides of the sheet are smooth, but this reinforcing fabric imparts to the product the desired toughness and durability. The product thus obtained embodies a sheet of rubber having the thickness of the entire fabric, and the combined thicknesses of the fabric and rubber found in ordinary rubber dam. However, the completed product need be no thicker than ordinary rubber dam.

If necessary or desired, the fabric may be passed through the rolls any number of times, or the fabric may be dipped into a rubber solution or compound, and subsequently passed between the rolls, so that the rubber will be forced into the voids of the reinforcing fabric.

It is to be understood that the form of my invention herewith shown and described is to be taken as a preferred example of the same, and that various changes in the shape, size, and arrangement of parts may be resorted to without departing from the spirit of my invention, or the scope of the subjoined claim.

Having thus described my invention, I claim:—

A thin and highly flexible fabric for use in baby pants or like articles of apparel, said fabric having substantially the thickness of ordinary rubber dam, said fabric comprising a sheet of rubber, and a relatively non-elastic open reinforcing fabric embedded in the rubber sheet between its opposite faces, said open fabric being permanently provided with relatively large voids to permit of the passage therethrough of the material of the rubber sheet, the open reinforcing fabric strengthening the completed fabric without increasing its thickness and serving to render the same relatively non-elastic.

In testimony whereof I affix my signature in presence of two witnesses.

GOODWIN B. SMITH.

Witnesses:
 MARGARET M. McNULTY,
 HELEN A. CLEMENTS.